(12) United States Patent
Trageser (10) Patent No.: US 10,112,610 B2
(45) Date of Patent: Oct. 30, 2018

(54) REGIONAL ADJUSTMENT FOR DRIVER ASSISTANCE FUNCTIONS

(71) Applicant: Robert Bosch GmbH, Stuttgart (DE)

(72) Inventor: Vern Trageser, Mt. Pleasant, SC (US)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 15/130,765

(22) Filed: Apr. 15, 2016

(65) Prior Publication Data
US 2017/0297574 A1 Oct. 19, 2017

(51) Int. Cl.
| | |
|---|---|
| *B60W 30/16* | (2012.01) |
| *G01S 19/13* | (2010.01) |
| *G01S 13/93* | (2006.01) |
| *G08G 1/16* | (2006.01) |

(52) U.S. Cl.
CPC .......... *B60W 30/16* (2013.01); *G01S 13/931* (2013.01); *G01S 19/13* (2013.01); *G08G 1/166* (2013.01); *G08G 1/167* (2013.01); *B60W 2550/308* (2013.01); *G01S 2013/9321* (2013.01); *G01S 2013/9325* (2013.01); *G01S 2013/9332* (2013.01)

(58) Field of Classification Search
CPC . B60W 30/16; B60W 2550/308; G01S 19/13; G01S 13/931; G01S 2013/9332; G01S 2013/9321; G01S 2013/9325; G08G 1/167; G08G 1/166
See application file for complete search history.

(56) References Cited

U.S. PATENT DOCUMENTS

| | | | |
|---|---|---|---|
| 5,485,161 A | 1/1996 | Vaughn | |
| 5,864,771 A | 1/1999 | Yokoyama et al. | |
| 6,161,072 A | 12/2000 | Clapper | |
| 8,818,042 B2 | 8/2014 | Schofield et al. | |
| 2002/0022920 A1 | 2/2002 | Straub | |
| 2003/0109980 A1 | 6/2003 | Kojima et al. | |
| 2003/0225495 A1* | 12/2003 | Coelingh | B60G 17/0195 701/48 |
| 2005/0216172 A1 | 9/2005 | Schroder | |
| 2009/0037071 A1 | 2/2009 | Inoue | |

(Continued)

FOREIGN PATENT DOCUMENTS

WO 99/58358 11/1999

*Primary Examiner* — Hussein Elchanti
(74) *Attorney, Agent, or Firm* — Michael Best & Friedrich LLP (57) ABSTRACT

A vehicle control system and method for operating a host vehicle based on geographic location. The system includes a distance sensor, a location sensor, a user interface, and a controller including an electronic processor and a memory. The controller is communicatively coupled to the distance sensor, the location sensor, the speed control, and the user interface, and is configured to receive a distance signal from the distance sensor indicative of a distance between the host vehicle and another vehicle. The controller receives a location signal from the location sensor indicative of a location of the host vehicle and a control signal from the user interface indicative of a desired mode of operation of the vehicle control system. The controller performs a driver assistance function associated with the desired mode of operation and adjusts a tolerance of the driver assistance function based on the location of the host vehicle.

16 Claims, 5 Drawing Sheets

(56) References Cited

U.S. PATENT DOCUMENTS

| | | | |
|---|---|---|---|
| 2009/0228184 A1* | 9/2009 | Ueyama | B60W 30/095 |
| | | | 701/96 |
| 2010/0036562 A1 | 2/2010 | Becker | |
| 2010/0191436 A1* | 7/2010 | Hellmann | B60W 30/146 |
| | | | 701/96 |
| 2013/0226431 A1* | 8/2013 | Lu | B60W 50/0098 |
| | | | 701/96 |
| 2013/0238194 A1 | 9/2013 | Ueda et al. | |
| 2014/0249716 A1 | 9/2014 | Dorum et al. | |
| 2015/0307095 A1 | 10/2015 | Aso | |
| 2016/0010998 A1 | 1/2016 | Chia et al. | |
| 2016/0163198 A1* | 6/2016 | Dougherty | G08G 1/162 |
| | | | 340/905 |
| 2016/0229397 A1* | 8/2016 | Muthukumar | B60R 21/013 |
| 2016/0297434 A1* | 10/2016 | Merzig | B60W 30/16 |
| 2017/0144617 A1* | 5/2017 | Lee | B60K 31/00 |
| 2017/0282917 A1* | 10/2017 | Pilutti | B60K 35/00 |

* cited by examiner

REGIONAL ADJUSTMENT FOR DRIVER ASSISTANCE FUNCTIONS

BACKGROUND

Embodiments of the invention relate to automated vehicle control systems.

SUMMARY

One embodiment provides an adaptive control system for a host vehicle. In one example, the system includes a distance sensor, a location sensor, a user interface, and a controller including an electronic processor and a memory. The controller is communicatively coupled to the distance sensor, the location sensor, and the user interface, and is configured to receive a distance signal from the distance sensor indicative of a distance between the host vehicle and another vehicle. The controller receives a location signal from the location sensor indicative of a location of the host vehicle and a control signal from the user interface indicative of a desired mode of operation of the adaptive control system. The controller performs a driver assistance function associated with the desired mode of operation and adjusts a tolerance of the driver assistance function based on the location of the host vehicle.

Another embodiment provides a method of operating an adaptive control system. In one example, the method includes receiving, at a controller, a distance signal indicative of a distance between the host vehicle and another vehicle. The controller receives a location signal indicative of a location of the host vehicle and a control signal indicative of a desired mode of operation of the vehicle control system. The controller performs a driver assistance function associated with the desired mode of operation and adjusts a tolerance of the driver assistance function based on the location of the host vehicle.

Other aspects of the invention will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement embodiments of the invention. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
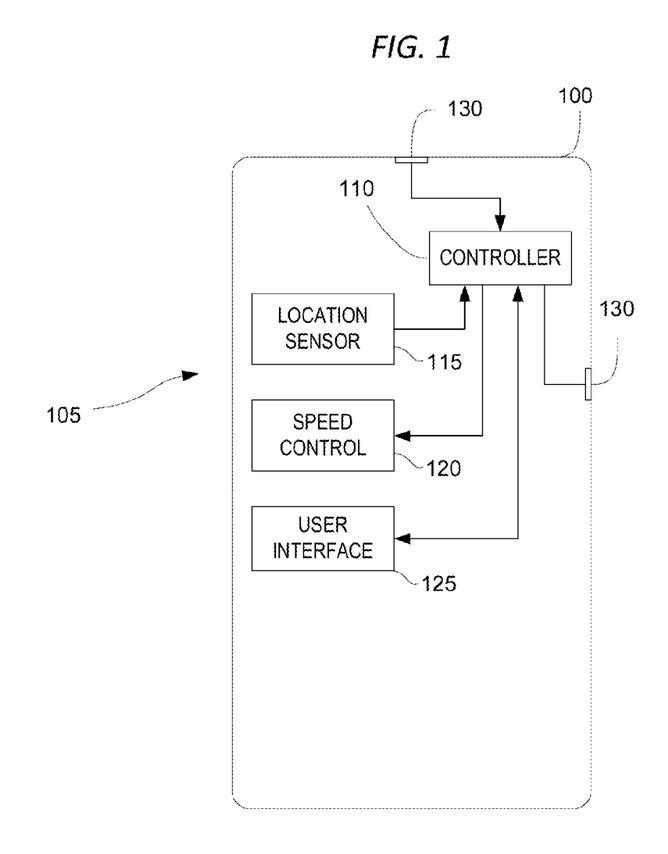
FIG. 1 is a block diagram of a vehicle equipped with an adaptive control system according to one embodiment.

Driver assistance systems are used by vehicles to automatically detect, identify, and respond to other vehicles on the same roadway. The vehicle in which the driver assistance system is installed is referred to as a "host vehicle." FIG. 1 illustrates a host vehicle 100 equipped with an adaptive control system 105 according to one embodiment. In the illustrative embodiment, the adaptive control system 105 is constructed of multiple components including a controller 110 (e.g., a programmable electronic control unit), a location sensor 115 (e.g., a Global Positioning System (GPS) sensor), a speed control 120, a user interface 125, and a distance sensor 130. The controller 110 is communicatively coupled to the location sensor 115, the speed control 120, the user interface 125, and the distance sensor 130 via various wired or wireless connections. For example, in some embodiments, the controller 110 is directly coupled via a dedicated wire to each of the above-listed components of the adaptive control system 105. In other embodiments, the controller 110 is communicatively coupled to one or more of the components via a shared communication link such as a vehicle communication bus (e.g., a controller area network (CAN) bus) or vehicle network (e.g., a wireless connection).

The components of the adaptive control system 105 may be of various constructions and types. For example, in some embodiments, the speed control 120 may be an electronically controlled throttle that controls acceleration of the host vehicle 100 by controlling power delivered to an engine of the host vehicle 100. The speed control 120 may also include a braking system that controls deceleration of the host vehicle 100. In another example, the user interface 125 may include a lever, panel, dial, light, display, and the like that provides input and output functionality for the controller 110. The user interface 125 may include one or more buttons selectable to change modes of operation of the host vehicle 100. The user interface 125 may also include an indicator (e.g., a light, an icon, an audible alarm, haptic feedback, and the like) for providing various indications to a driver of the host vehicle 100.

In some embodiments, the distance sensor 130 may be mounted on a front of the host vehicle 100 and be positioned with a field-of-view facing forward from the host vehicle 100. In other embodiments, the distance sensor 130 may be mounted on a side of the host vehicle (e.g., on a side mirror) and directed towards a side and rear blind spot of the host vehicle 100. In some embodiments, the adaptive control system 105 may include both a front-mounted and a side-mounted distance sensor 130. Depending on the position of the distance sensor 130, the distance sensor 130 may be configured to detect a target vehicle in front of the host vehicle 100 or adjacent to the host vehicle 100 (e.g., in the side-rear blind spot). In yet another example, the distance sensor 130 includes radio detection and ranging (RADAR) or light detection and ranging (LIDAR) components and functionality. In such an example, the distance sensor 130 is configured to transmit signals from the host vehicle 100 and to receive reflected signals indicative of a distance between the host vehicle 100 and a target vehicle.

Each of the above-listed components of the adaptive control system 105 may include dedicated processing circuitry including an electronic processor and memory for receiving data, processing data, and transmitting data. In this way, each of the components of the adaptive control system 105 may communicate with the controller 110 using a predetermined communication protocol. The embodiment illustrated in FIG. 1 provides but one example of the components and connections of the adaptive control system 105. However, these components and connections may be constructed in other ways than those illustrated and described herein.

Figure 2:
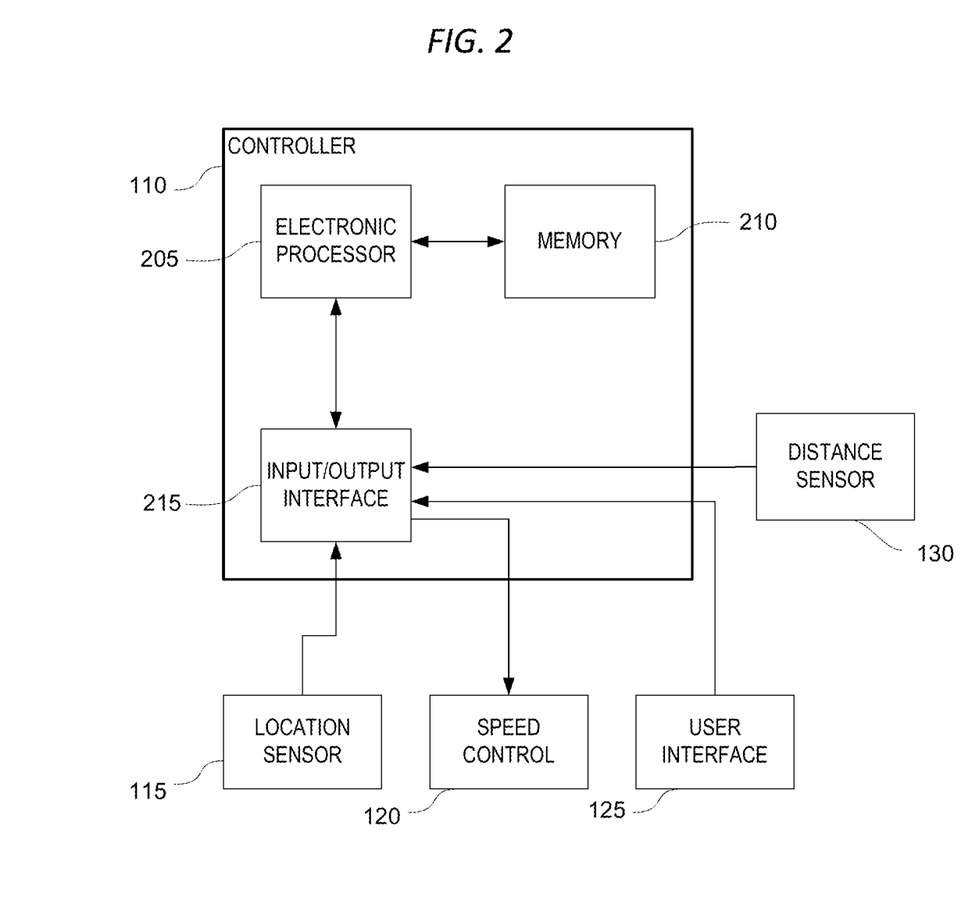
FIG. 2 is a block diagram of a controller of the adaptive control system of FIG. 1 according to one embodiment.

FIG. 2 is a block diagram of the controller 110 of the adaptive control system 105 according to one embodiment. The controller 110 includes a plurality of electrical and electronic components that provide power, operation control, and protection to the components and modules within the controller 110. The controller 110 includes, among other things, an electronic processor 205 (such as a programmable electronic microprocessor, microcontroller, or similar device), a memory 210 (e.g., non-transitory, machine readable memory), and an input/output interface 215. In other embodiments, the controller 110 includes additional, fewer, or different components. The controller 110 may be implemented in several independent controllers (e.g., electronic control units) each configured to perform specific functions or sub-functions. Additionally, the controller 110 may contain sub-modules that include additional electronic processors, memory, or application specific integrated circuits (ASICs) for handling input/output functions, processing of signals, and application of the methods listed below.

The controller 110 and associated systems are configured to implement, among other things, processes and methods described herein. For example, the electronic processor 205 is communicatively coupled to the memory 210 and executes instructions which are capable of being stored on the memory 210. The electronic processor 205 is configured to retrieve from memory 210 and execute instructions related the methods of operation of adaptive control system 105. As described further below, the memory 210 may include a database that stores predetermined relationships to generate operating tolerances for the adaptive control system 105. In some embodiments, the input/output interface 215 includes drivers, relays, switches, and the like to operate the speed control 120 based on instructions from the electronic processor 205. In some embodiments, the input/output interface 215 communicates with the other vehicle controllers by means of a protocol such as J1939 or CAN bus. In other embodiments, the input/output interface 215 communicates under other suitable protocols, including analog or digital signals, depending on the needs of the specific application.

Figure 3:
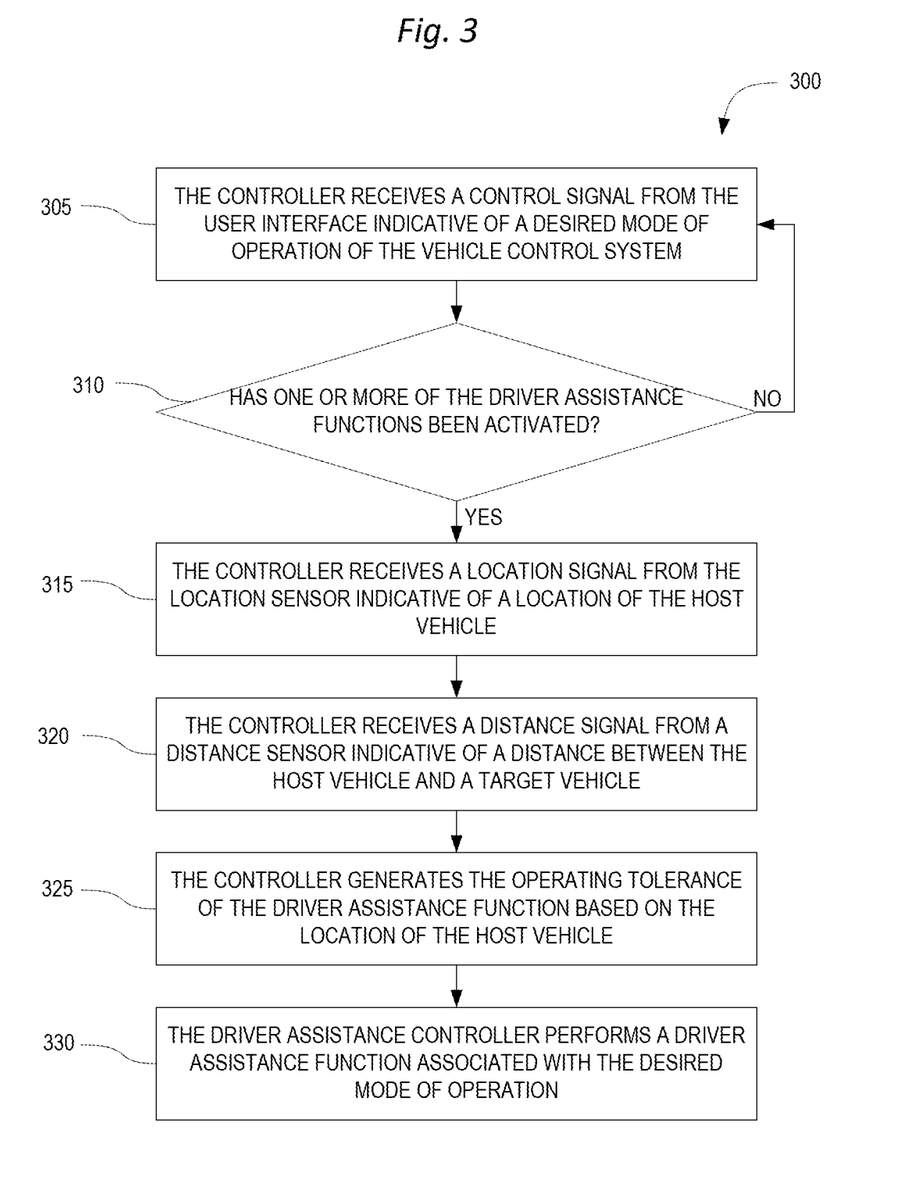
FIG. 3 is a flowchart of a method of operating a vehicle with the adaptive control system of FIG. 1 according to one embodiment.

FIG. 3 illustrates a flowchart of a method 300 of operating the host vehicle 100 with the adaptive control system 105 according to one embodiment. The method 300 includes generating an operating tolerance of a particular driver assistance function. Based on which driver assistance function is active, the adaptive control system 105 generates one or more operating tolerances that provide limits or set points of operation. In some embodiments, the adaptive control system 105 operates based on a desired mode of operation (i.e., a mode that initiates a particular driver assistance function). The user interface 125 may receive a selection from a driver of the host vehicle 100 indicating the desired mode of operation such as adaptive cruise control or blind spot monitoring. Based on the desired mode of operation, the controller 110 may perform a variety of driver assistance functions each with one or more associated operating tolerances. For example, the controller 110 may operate in an adaptive cruise control mode, a blind spot monitoring mode, or both based on the received selection.

At block 305 of the method 300, the controller 110 receives a control signal from the user interface 125 indicative of the desired mode of operation of the adaptive control system 105. The controller 110 determines if one or more of the driver assistance functions is activated based on the desired mode of operation (block 310). The controller 110 receives a location signal from the location sensor 115 indicative of a geographic location of the host vehicle 100 (block 315). In addition, the controller 110 receives a distance signal from a distance sensor 130 indicative of a distance between the host vehicle 100 and the target vehicle (block 320). The controller 110 generates an operating tolerance of the selected driver assistance function based on the location of the host vehicle 100 (block 325). Next, the controller 110 performs a driver assistance function associated with the desired mode of operation (block 330). The controller 110 may perform each of the driver assistance functions by communicating and instructing various other electronic control units and automated systems within the host vehicle 100.

It should be noted that the order of the steps of the method 300 are not critical to the performance of the method 300. The steps of the method 300 may be performed in alternate orders than illustrated or the steps may be performed simultaneously. For example, the controller 110 may continuously receive the location signal and automatically generate the operating tolerance once the mode of operation has been selected. In other embodiments, the controller 110 may continuously receive the location signal and the distance signal and continuously generate multiple operating tolerances based on the location signal. Once the mode of operation is selected, the controller 110 then activates the driver assistance function using the associated one of the multiple operating tolerances.

Figure 4A:
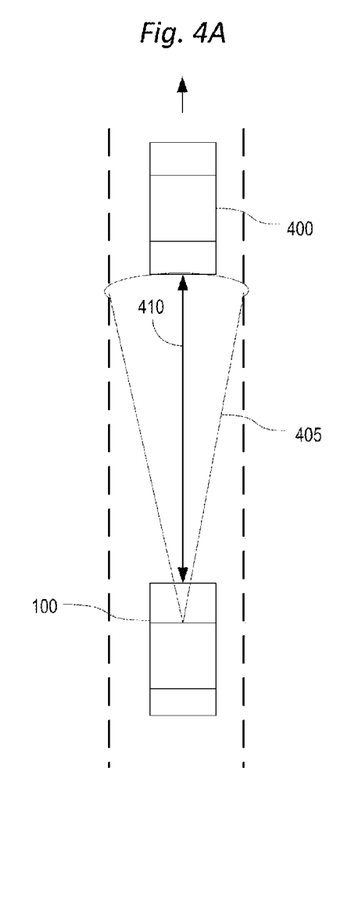
FIGS. 4A-4C are block diagrams of a first traffic scenario in which the adaptive control system of FIG. 1 reacts differently based on a geographic location of the vehicle according to one embodiment.
Figure 4B:
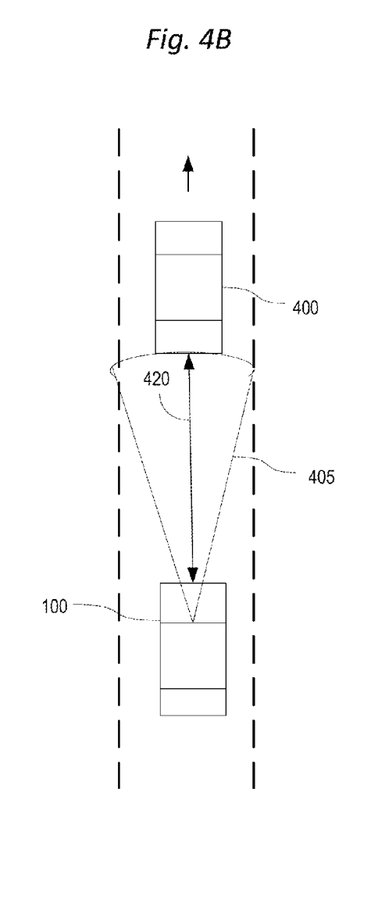
Figure 4C:
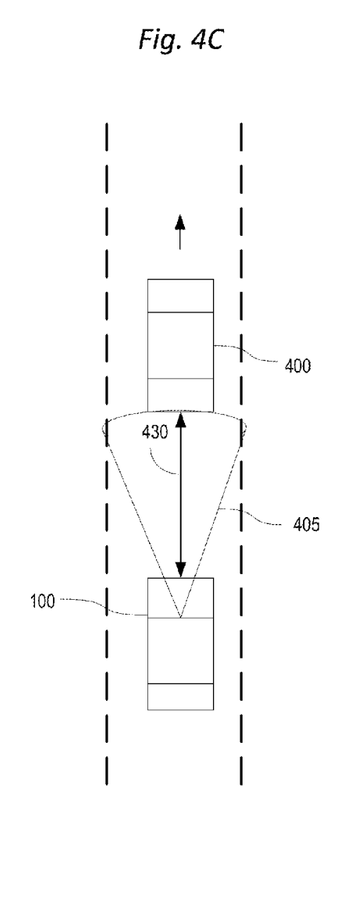

FIGS. 4A through 4C illustrate a first driving scenario in which the adaptive cruise control mode is performed by the controller 110. As described in block 325 of method 300, the controller 110 generates an operating tolerance of the selected driver assistance function based on the location of the host vehicle 100. In the case of adaptive cruise control, the operating tolerance includes at least a following distance between the host vehicle 100 and another vehicle. In this example, the following distance varies depending on the geographic location of the host vehicle 100. The values of the following distance, generated by the controller 110 and based on the geographic location of the host vehicle 100, are predetermined and preloaded into the memory 210 of the controller 110. As a consequence, when entering into adaptive cruise control mode, the controller 110 references the memory 210 to generate an appropriate following distance based on the geographic location as sensed by the location sensor 115.

When in a rural environment, the controller 110 sets the following distance at a maximum value as illustrated in FIG. 4A. Angled lines emanating from the host vehicle 100 illustrate a field of view 405 of the distance sensor 130. The controller 110 receives a distance signal from the distance sensor 130 indicative of a first distance 410 between the target vehicle 400 and the host vehicle 100. In this example, the controller 110 sets and maintains the following distance to be equal to the first distance 410 via the speed control 120. For example, when the distance signal indicates that the first distance 410 is greater than the following distance, the controller 110 accelerates the host vehicle 100 via the speed control 120. Similarly, when the distance signal indicates that the first distance 410 is less than the following distance, the controller 110 decelerates the host vehicle 100 via the speed control 120. In this way, the controller 110 maintains the following distance at the first distance 410 between the host vehicle 100 and the target vehicle 400.

As illustrated in FIG. 4B, the controller 110 may set the following distance at a median value that is less than the first distance 410. In this example, the controller 110 sets and maintains the following distance to be equal to a second distance 420 via the speed control 120. The controller 110 selects the second distance 420 for the following distance when the host vehicle 100 is located in a geographic area that is neither a rural or an urban area or when the controller 110 cannot determine or classify the geographic area (e.g., when lacking information in the database for that geographic area or upon a loss of signal from the location sensor 115). In this way, the second distance 420 acts as a default value for the following distance while the host vehicle 100 is performing adaptive cruise control. The second distance 420 is less than the first distance as shown in FIG. 4A.

As illustrated in FIG. 4C, the controller 110 may set the following distance to be equal to a third distance 430. The third distance 430 is set and maintained by the controller 110 when the host vehicle 100 is in an urban area. In this way, the controller 110 sets the following distance to be at a minimum value when the host vehicle 100 is in an urban area. As such, the third distance 430 is less than both the first distance 410 and the second distance 420.

In adaptive cruise control, the operating tolerance may also include additional tolerances besides the following distance. The additional tolerances may also be based on the geographic area. For example, the operating tolerance may include maximum and minimum travelling speeds, acceleration limits, deceleration limits, and the like. In one example, the adaptive cruise control mode may have an operating tolerance that sets a reaction time (e.g., a time interval from when a change in following distance is acted upon and the speed control 120 is activated) and a magnitude of response (e.g., a level of acceleration or deceleration when the change in following distance is detected). In this example, in urban areas, the controller 110 may set quicker reaction times, greater acceleration and deceleration levels, or both. Conversely, when in rural areas, longer response times and lower acceleration and deceleration levels may be used.

Figure 5A:
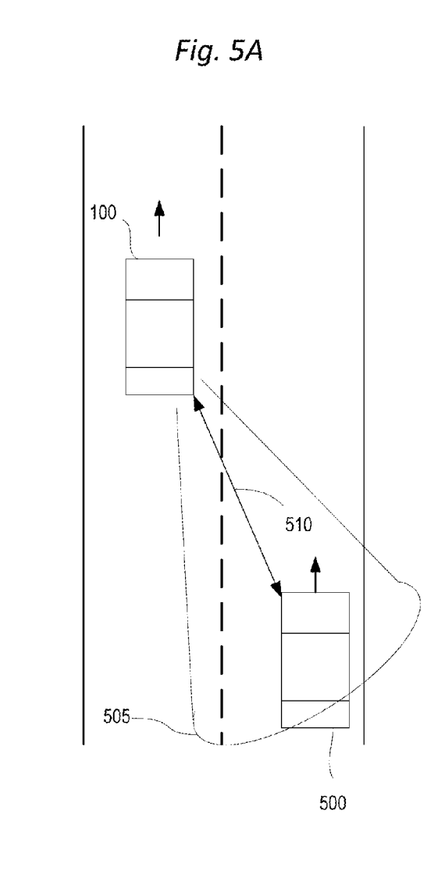
FIGS. 5A-5C are block diagrams of a second traffic scenario in which the adaptive control system of FIG. 1 reacts differently based on a geographic location of the vehicle according to one embodiment.
Figure 5B:
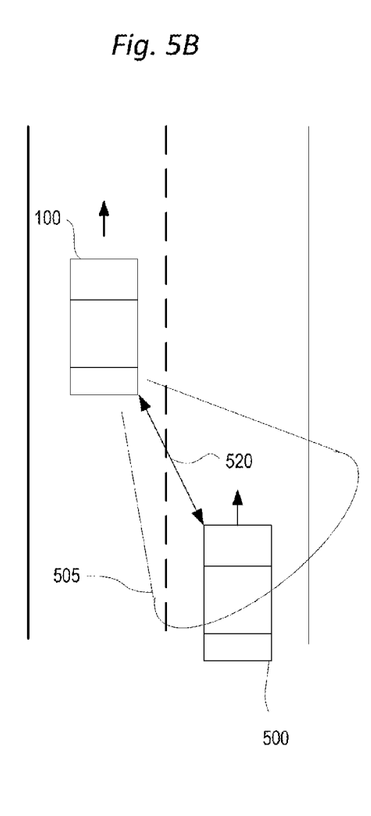
Figure 5C:
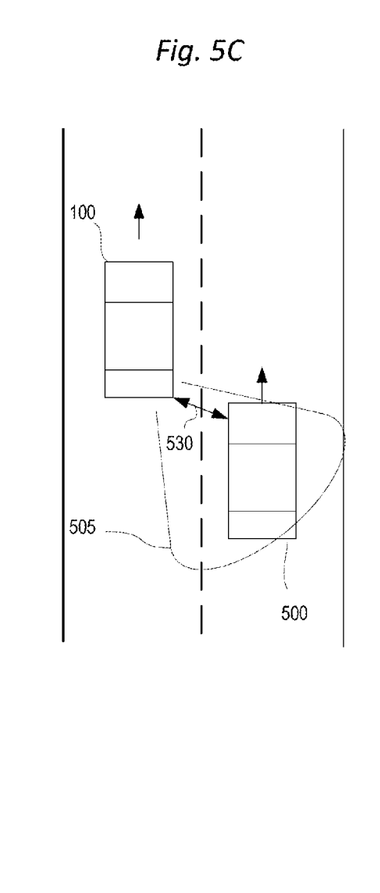

FIGS. 5A-5C illustrate a second driving scenario in which the blind-spot monitoring mode is performed by the controller 110 according to one embodiment. When in the blind-spot monitoring mode (e.g., based on a selection on the user interface 125 or on automatic activation), the controller 110 monitors vehicles positioned adjacent to the host vehicle 100. For example, the controller 110 may monitor vehicles positioned in a side/rear blind-spot of the host vehicle 100. As described in block 325 of method 300, the controller 110 generates an operating tolerance of the selected driver assistance function based on the location of the host vehicle 100. In this case, the operating tolerance includes a value of a distance between the host vehicle 100 and blind-spot vehicles when a blind-spot warning is triggered.

When in a rural environment, the controller 110 sets a triggering distance at a first value (e.g. a maximum value), as illustrated in FIG. 5A. The controller 110 determines the triggering distance based on the geographic location of the host vehicle 100. In particular, the controller 110 sets and maintains the triggering distance based on a predetermined distance threshold retrieved by the controller 110 from the memory 210. Angled lines emanating from the host vehicle 100 illustrate a side field-of-view 505 of the distance sensor 130. The controller 110 receives a distance signal from the distance sensor 130 indicative of a first distance 510 between the target vehicle 500 and the host vehicle 100. The first distance 510 generally depicts the triggering distance when in a rural area. When the distance signal indicates that the first distance 510 is less than the triggering distance (i.e., the target vehicle 500 is closer to the host vehicle 100 than the distance threshold), the controller 110 sends a signal to the user interface 125 indicator indicating the presence of another vehicle in the blind-spot of the host vehicle 100. As a consequence, when the host vehicle 100 is in a geographic area that is rural, the indicator of the user interface 125 indicates the presence of other vehicles at further distances than described in reference to FIGS. 5B and 5C, and thus provides maximum warning to the driver.

As illustrated in FIG. 5B, the controller 110 may set the triggering distance to be at a second value, which may be a normative operating tolerance or default value. In this example, a second distance 520 generally depicts the triggering distance at the second value. As shown in FIG. 5A, the second value of the triggering distance is less than the first value of the triggering distance. The controller 110 sets and maintains the triggering distance to trigger at the second value when the host vehicle 100 is located in a geographic area that is neither rural or urban or when the controller 110 cannot determine or classify the geographic area (e.g., when lacking information in the database for that geographic area or upon a loss of signal from the location sensor 115). In this way, the second value acts as a default value for the triggering distance. When the controller 110 determines that the second distance 520 is less than the triggering distance, the controller 110 sends a signal to the user interface 125 indicating the presence of another vehicle in or close to the blind-spot of the host vehicle 100. As a consequence, when the host vehicle 100 is in a geographic area that is not rural or urban, the indicator of the user interface 125 indicates the presence of other vehicles at moderate distances from the host vehicle 100, and thus provides moderate warning to the driver As illustrated in FIG. 5C, the controller 110 may set the triggering distance to be at a third value, which is a minimum value for the triggering distance. In this example, a third distance 530 generally depicts the triggering distance at the third value. The third value of the triggering distance is less than the first value and the second value of the triggering distances as shown in FIGS. 5A and 5B. The controller 110 sets and maintains the triggering distance to trigger at the third value when the host vehicle 100 is located in a geographic area that is classified as urban. When the controller 110 determines that the third distance 530 is less than the triggering distance, the controller 110 sends a signal to the user interface 125 indicating the presence of another vehicle in the blind-spot of the host vehicle 100. As a consequence, when the host vehicle 100 is in a geographic area that is urban, the indicator of the user interface 125 indicates the presence of other vehicles at only short distances from the host vehicle 100. This decreases the occurrence of over-frequent notifications to the driver that may occur in heavy traffic.

In some embodiments, the adaptive control system 105 operates using more or less than the three geographic areas (i.e., urban, rural, and default) as discussed herein. In these embodiments, other geographic areas may be defined. In addition, geographic classifications may not be used. For example, each geographic location in the memory 210 may be associated with a particular value of the operating tolerance without having a definition of a type of geographic area. As a consequence, the operating tolerance may include a broad range of values, and not just three predetermined values based on a geographic area as described in reference to method 300.

In some embodiments, the controller 110 may be programmed with a single predetermined value for each of the operating tolerances. In these embodiments, the controller 110 references the memory 210 to determine an adjustment factor associated with each particular geographic area. For example, an adjustment factor for an urban area may be subtracted from the single predetermined value of the operating tolerance to obtain an optimized following distance. In another example, the controller 110 may reference the memory 210 to determine an adjustment factor associated with a rural area when in blind-spot monitoring mode. In this example, the controller 110 may add or multiply the adjustment factor with a standard value to obtain an optimized triggering distance that is greater for the urban area.

Thus, embodiments of the invention provides, among other things, a vehicle control system and method for operating a host vehicle equipped with an adaptive control system that generates operating tolerances based on geographic location. Various features and advantages of the invention are set forth in the following claims.

What is claimed is:

1. An adaptive control system for a host vehicle, the system comprising:
   a distance sensor;
   a location sensor;
   a user interface; and
   a controller including an electronic processor and a memory, the controller communicatively coupled to the distance sensor, the location sensor, and the user interface, the controller configured to
      receive a control signal from the user interface indicative of a desired mode of operation of the vehicle control system, the desired mode of operation of the vehicle control system including an adaptive cruise control mode, a blind spot monitoring mode, and both the adaptive cruise control mode and the blind spot monitoring mode;
      receive a distance signal from the distance sensor indicative of a distance between the host vehicle and another vehicle;
      receive a location signal from the location sensor indicative of a location of the host vehicle, wherein the location is at least one selected from the group consisting of a rural area, an urban area, and neither a rural area nor an urban area;
      generate an operating tolerance for a driver assistance function that is greater than, less than, or equal to a normative operating tolerance based on the location of the host vehicle, wherein the operating tolerance is a following distance or a distance threshold for the distance between the host vehicle and the another vehicle when the another vehicle is in a blind spot of the host vehicle; and
      perform the driver assistance function associated with the desired mode of operation, the driver assistance function incorporating the operating tolerance.

2. The adaptive control system of claim 1, wherein the controller is further configured to reference a database included within the memory to generate the operating tolerance based on the location of the host vehicle.

3. The adaptive control system of claim 1, wherein the location sensor is a global positioning system (GPS) sensor, and wherein the controller is configured to
   determine the location of the host vehicle based on the GPS sensor to obtain a geographic location of the host vehicle, and
   determine the operating tolerance of the driver assistance function based on the geographic location of the host vehicle.

4. The adaptive control system of claim 1, wherein the user interface includes a button to select the desired mode of operation of the adaptive control system.

5. The adaptive control system of claim 1, wherein the controller is further configured to
   perform the driver assistance function by setting and maintaining the following distance between the host vehicle and the another vehicle when the another vehicle is located in front of the host vehicle.

6. The adaptive control system of claim 5, wherein the controller is further configured to
   generate the operating tolerance of the driver assistance function by selecting a following distance that is less than the normative operating tolerance when the location of the host vehicle is the urban area.

7. The adaptive control system of claim 6, wherein the controller is further configured to
   generate the operating tolerance of the driver assistance function by selecting a following distance that is greater than the normative operating tolerance when the location of the host vehicle is the rural area.

8. The adaptive control system of claim 1, wherein the controller is further configured to
   perform the driver assistance function by generating a notification for a driver of the host vehicle when the another vehicle is located closer to the host vehicle than the distance threshold.

9. A method of controlling a host vehicle, the method comprising:
   receiving, at a controller, a control signal indicative of a desired mode of operation of the vehicle control system, the desired mode of operation of the vehicle control system including an adaptive cruise control mode, a blind spot monitoring mode, and both the adaptive cruise control mode and the blind spot monitoring mode;
   receiving, at the controller, a distance signal from a distance sensor, the distance signal indicative of a distance between the host vehicle and another vehicle;
   receiving, at the controller, a location signal indicative of a location of the host vehicle, wherein the location is at least one selected from the group consisting of a rural area, an urban area, and neither a rural area nor an urban area;

generating, at the controller, an operating tolerance of a driver assistance function that is greater than, less than, or equal to a normative operating tolerance based on the location of the host vehicle, wherein the operating tolerance is a following distance or a distance threshold for the distance between the host vehicle and the another vehicle when the another vehicle is in a blind spot of the host vehicle; and performing, at the controller, the driver assistance function associated with the desired mode of operation.

10. The method of claim 9, further comprising:
referencing a database to determine the operating tolerance of the driver assistance function based on the location of the host vehicle.

11. The method of claim 9, further comprising:
determining the location of the host vehicle based on a global positioning system (GPS) sensor to obtain a geographic location of the host vehicle, and
determining the operating tolerance of the driver assistance function based on the geographic location of the vehicle.

12. The method of claim 9, further comprising
receiving a selection, via a user interface, of the desired mode of operation of the adaptive control system.

13. The method of claim 9, wherein
performing the driver assistance function is performed by setting and maintaining the following distance between the host vehicle and the another vehicle when the another vehicle is located in front of the host vehicle.

14. The method of claim 13, wherein
generating the operating tolerance of the driver assistance function is performed by selecting a following distance that is less than the normative operating tolerance when the location of the host vehicle is the urban area.

15. The method of claim 14, wherein
generating the operating tolerance of the driver assistance function based on the location of the host vehicle is performed by selecting a following distance that is greater than the normative operating tolerance when the location of the host vehicle is the rural area.

16. The method of claim 9, wherein
performing the driver assistance function is performed by generating a notification for a driver of the host vehicle when the another vehicle is located closer to the host vehicle than the distance threshold.

* * * * *